Oct. 29, 1940.  K. M. HARDER ET AL  2,219,282
ELECTRICAL GAUGE
Filed Dec. 14, 1938
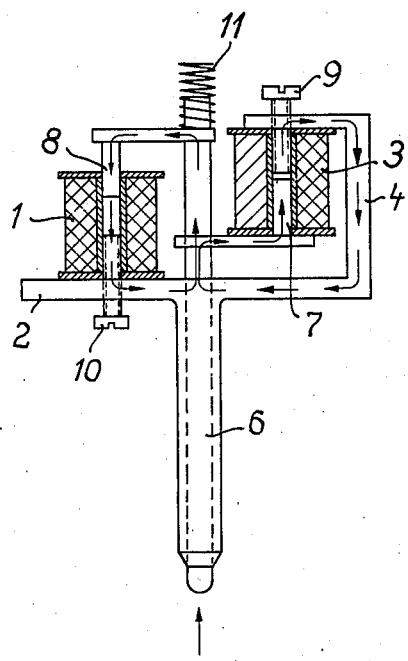
Inventors:
Karl Max Harder,
Theobald Ehrler,
By Potter, Pierce & Scheffler,
Attorneys.

Patented Oct. 29, 1940

2,219,282

UNITED STATES PATENT OFFICE 2,219,282

ELECTRICAL GAUGE

Karl Max Harder and Theobald Ehrler, Hamburg, Germany, assignors to Bauer & Schaurte, Neuss, Rhine, Germany Application December 14, 1938, Serial No. 245,760
In Germany December 14, 1937

3 Claims. (Cl. 177—351)

This invention relates to electrical gauges. It is known to use for the measuring of lengths by electrical means two alternating-current choking coils designed as horseshoe magnets or pot magnets and arranged opposite to one another, between which coils an armature may be moved by a feeler element in such a manner that it increases the electrical resistance of one of the choke coils and decreases at the same time that of the other. Calibration of such system is effected by regulating the distance between the magnet poles and the armature. As the magnets used in connection with the choke coils are, as a rule, pot magnets or horse-shoe magnets, it is necessary to displace the coils, the cores, and the yokes when measurements are being effected.

It has already been proposed to use as measuring choke coil for use in connection with apparatus for measuring lengths a coil whose iron core consists of two parts, of which one is displaceable, and which are magnetically connected with one another outside of the coil.

The present invention is based on a design of this nature, the displaceable iron parts of two coils according to the invention being connected with a feeler element in such a manner that by moving the feeler element the gap between the core parts in the interior of one of the coils is increased and is at the same time reduced in the other. The rigid core part in each coil is spaced from the movable core part by an air gap and is adjustable independently of the movement of the feeler pin. The rigid core parts are preferably designed as screws whose female threads are arranged in an iron piece completing the magnetic circuit of the displaceable core parts. Calibration of this system takes place without displacing the coil and the yoke, merely by actuating the two screws representing the two rigid core parts. This results in material constructional simplification of the apparatus.

The drawing shows diagrammatically and by way of example a constructional form of the invention.

The coil 1 is secured to the iron base 2 and the coil 3 to an iron bracket 4. The feeler pin 6 carries the two movable iron core pieces 7 and 8 which are arranged in the hollow spaces of the coils 1 and 3 spaced from the two screws 9 and 10 forming the rigid core pieces by an air gap in the interior of the coils. The feeler pin is pushed downwards by the spring 11. The path of the lines of force is indicated by arrows. The coils 1 and 3 are arranged in known manner in the branches of a self-induction bridge.

If the feeler pin 6 is moved, say, in the direction of the arrow shown, below the figure, the distance between the core parts 7 and 9 will be lessened, whereby the completed magnetic circuit of the coil 3 will be improved and its self-induction will be increased. At the same time the distance between the core parts 8 and 10 will be increased and in consequence thereof the completed magnetic circuit of the coil 1 will become poorer, so that the self-induction of the coil will be lessened. The initial distance between the core parts 7 and 9, and 8 and 10 respectively, can be regulated for calibration of the apparatus by adjusting the screws 9 and 10.

We claim:

1. In an electrical gauge, two alternating-current choke coils supported side by side on an iron supporting member, a normally stationary core member extending partially into the interior of each of said coils at the mutually remote ends thereof, a movable core member extending into the interior of each of said coils at the opposite ends thereof from said stationary members to provide an air gap between said core members in the interior of each of said coils, a movable member guided by said iron supporting member and operatively connected to said movable core members, said normally stationary core members being supported by said iron supporting members.

2. In an electrical gauge, two alternating-current choke coils, a normally stationary core member and a movable core member positioned in the interior of each coil with an air gap in the interior of each coil between said members, said normally stationary core members being axially adjustable within their corresponding coils, means connecting said movable core members in such manner that movement of said connecting means in one direction causes movement of one of said movable core members in a direction to decrease the air gap associated therewith and movement of the other of said movable core members in a direction to increase the air gap associated therewith and that movement of the connecting means in the opposite direction reverses the said movements of the movable core members, and a feeler member in operative connection with said connecting means.

3. A device as defined in claim 2 in which the normally stationary core members are mounted in threaded engagement with supporting members carrying said coils and forming a portion of the magnetic circuits of said coils.

KARL MAX HARDER.
THEOBALD EHRLER.